United States Patent
Aydin et al.

(10) Patent No.: US 8,054,806 B2
(45) Date of Patent: Nov. 8, 2011

(54) METHOD AND APPARATUS FOR RADIO LINK FAILURE RECOVERY IN A WIRELESS COMMUNICATIONS NETWORK

(75) Inventors: Osman Aydin, Stuttgart (DE); Hajo-Erich Bakker, Eberdingen (DE); Heidrun Grob-Lipski, Starzach (DE); Markus Gruber, Korntal-Muenchingen (DE); Stephen Kaminski, Eislingen (DE); Klaus Keil, Esslingen (DE); Sudeep Kumar Palat, Swindon (GB)

(73) Assignee: Alcatel Lucent, Paris (FR)

( * ) Notice: Subject to any disclaimer, the term of this patent is extended or adjusted under 35 U.S.C. 154(b) by 13 days.

(21) Appl. No.: 12/221,904

(22) Filed: Aug. 7, 2008

(65) Prior Publication Data
US 2009/0046578 A1     Feb. 19, 2009

(30) Foreign Application Priority Data
Aug. 14, 2007 (EP) .................................. 07291011

(51) Int. Cl.
*G08C 17/00* (2006.01)

(52) U.S. Cl. ........................ 370/331; 455/436

(58) Field of Classification Search .............. 370/328, 370/331; 455/436
See application file for complete search history.

(56) References Cited

U.S. PATENT DOCUMENTS

| 6,721,567 | B1 * | 4/2004 | Wang et al. | 455/440 |
| 7,206,604 | B2 * | 4/2007 | Berra et al. | 455/560 |
| 7,593,731 | B2 * | 9/2009 | Lim et al. | 455/436 |
| 7,623,864 | B2 * | 11/2009 | Kang et al. | 455/438 |
| 2005/0026615 | A1 * | 2/2005 | Kim | 455/436 |
| 2009/0116434 | A1 * | 5/2009 | Lohr et al. | 370/329 |

FOREIGN PATENT DOCUMENTS

EP     07 29 1011     2/2008

OTHER PUBLICATIONS

Vodafone Group: "Mobility in LTE_ACTIVE state:", 3GPP TSG RAN WG2#58BIS, [Online] No. R2-072823, Jun. 29, 2007, Orlando, US, Jun. 25-29, 2007, Retrieved from the Internet: URL:http://www.3gpp.org/ftp/tsg_ran/WG2_RL2/TSGR2_58bis/Docs/R2-072823.zip>.

(Continued)

*Primary Examiner* — Ricky Ngo
*Assistant Examiner* — Ben Liu

(57) ABSTRACT

In a wireless network, for example, an LTE network, the context information relating to a mobile terminal UE is transmitted to a plurality of network nodes eNB 2, 3 and 4 from a source network node, eNB 1. One of the eNB 2 is a handover target node and also reserves resources for the UE in anticipation of receiving it after handover. The other eNBs 3 and 4 do not reserve resources. In the event of radio link failure, the UE may attach to one of the designated eNBs 3 and 4 that have not reserved resources, but that do recognize the UE because they have received its context. The method reduces the likelihood of the UE needing to go via the time consuming IDLE state while only reserving resources at a handover target eNB.

14 Claims, 1 Drawing Sheet

OTHER PUBLICATIONS

Nokia Siemens Networks, Alcatel-Lucent, Ericsson, Motorola, Nokia, Nortel, NTT DOCOMO, QUALCOMM Europe, Verizon Wireless: "Radio Link Failure Recovery", 3GPP TSG-RAN WG2 Meeting #58, [Online] No. R2-072382, Jun. 29, 2007, Orlando, US Jun. 25-29, 2007, Retrieved from the Internet: URL:http//www.3gpp.org/ftp/tsg_ran/WG2_RL2/TSGR2_58bis/Docs/R2-072382.zip>.

Nokia, NSN: "Handover Failure Recovery", 3GPP TSG-RAN WG2 Meeting #58, [Online] No. R2-071717, May 11, 2007, Kobe, Japan, May 7-11, 2007, Retrieved from the Internet: URL:http://www.3gpp.org/ftp/tsg_ran/WG2_RL2/TSGR2_58/Documents/R2-071717.zip>.

\* cited by examiner

METHOD AND APPARATUS FOR RADIO LINK FAILURE RECOVERY IN A WIRELESS COMMUNICATIONS NETWORK

FIELD OF THE INVENTION

The present invention relates to a method and apparatus for radio link failure recovery in a wireless communications network, and more particularly, but not exclusively, to a method and apparatus implemented in accordance with the 3rd Generation Partnership Project (3GPP) evolved Universal Terrestrial Radio Access Network (E-UTRAN) and evolved Universal Terrestrial Radio Access (E-UTRA) specifications.

BACKGROUND OF THE INVENTION

Currently, 3GPP is considering development of E-UTRA and E-UTRAN as set out in the technical specification 3GPP TS 36.300 v 8.1.0 (2007-06), incorporated herein by way of reference, and related documents. 3GPP Long Term Evolution (LTE) aims to enhance the Universal Mobile Telecommunications System (UMTS) standard, for example, by improving efficiency and services.

In E-UTRAN, user equipment (UE) communicates with a network node, NodeB (eNB), with data being sent on radio bearers (RBs) over a radio link between them. The eNB interfaces with a Mobile Management Entity (MME) via an interface designated as S1. The E-UTRAN network includes a plurality of eNBs and MMEs. The connection between the UE and the source eNB to which it is attached may be lost, this being known as radio link failure (RLF). It had previously been proposed that a UE experiencing an RLF and reappearing in a cell of another eNB would be handled as a transition via an idle state, RRC_IDLE. In this mechanism, when there is RLF in the source eNB, the UE enters IDLE state and selects a new target eNB. When the UE has attached to the new target eNB, and received the system information for the target eNB, the UE may perform the access procedure to establish resources in the target eNB. However, this procedure is time-consuming.

RLF may be particularly likely during fading channel conditions, when handover from the source eNB to a target eNB may be imminent. To avoid going via the IDLE state, it has been suggested that a new eNB could be prepared beforehand to accept the UE by using the handover preparation procedure. The Handover_Request message can be sent to multiple eNBs which are thus able to recognize the UE, each of the eNBs being prepared as handover candidates. Then, the UE is able to carry on with its old context after having chosen the new target eNB during the mobility phase of the RLF.

The paper by Nokia Siemens Networks et al "Radio Link Failure Recovery", R2-072382, 3GPP TSG-RAN WG2 Meeting #58, incorporated herein by way of reference, discusses RLF recovery by preparing multiple eNBs using the handover procedure. A prepared eNB has the UE context and resources reserved, so by preparing multiple eNBs, the probability is increased that the UE can recover from RLF without needing to go via RRC_IDLE, thus reducing recovery time.

The paper by Nokia and NSN "Handover Failure Recovery" R2-071717, 3GPP TSG-RAN WG2 Meeting #58, incorporated herein by way of reference, and the paper by Vodafone "Mobility in LTE_ACTIVE state, R2-0723823, GPP TSG-RAN WG2 Meeting #58, incorporated herein by way of reference, also consider the preparation of multiple eNBs during handover to avoid the UE going via the IDLE state.

BRIEF SUMMARY OF THE INVENTION

According to a first aspect of the invention, a method for radio link failure recovery in a wireless communications network includes the steps of: designating a network node as a candidate to accept a mobile terminal in the event of failure of a radio link between the mobile terminal and a source network node; and sending to the designated network node context information for said mobile terminal and an indication to the designated network node not to reserve resources for said mobile terminal. There may be a plurality of designated network nodes, each of which receives the mobile terminal context information but no indication to reserve resources for it. The mobile terminal context information is the information used for the network node to recognise the mobile terminal.

The invention is particularly applicable to arrangements in accordance with LTE but it may advantageously be used in networks complying with other specifications or standards. In LTE, the mobile terminal is a UE and the network nodes are eNBs.

By employing the invention, when there is radio link failure, if the mobile terminal appears in the cell of a designated network node, that node will recognize it and is able to initiate procedures to complete the connection without this needing to be set up from the beginning. In an LTE network, this avoids the UE entering the IDLE state, and thus reduces the time required to recover a radio link connection with the UE.

Use of the invention is also particularly advantageous because no valuable resources are reserved by the designated network nodes for use by the mobile terminal.

In another method in accordance with the invention, in addition to designating network nodes without reserving resources, a network node is selected as a handover target candidate in the event of handover of the mobile terminal from the source network node; and the handover target network node is sent context information for said mobile terminal and an indication to that network node to reserve resources for said mobile terminal. As noted above, RLF is more probable when handover is likely because of degradation in channel conditions. By only requiring that the handover target network node reserve resources, but still transmitting mobile terminal context information to one or more other designated network nodes without reservation of resources, it makes it possible for a mobile terminal to access another network node in the event of RLF without going via IDLE, but valuable resources are only reserved for the candidate to which the mobile terminal is more likely to become connected. The designated network nodes are available as a backup solution if the mobile terminal does not connect to the handover target network node.

Reserved resources may include allocating the time and frequency domain at the handover target network node, related to its capacity for data transmission. Other resources may include a preamble, which is a special code, with which a UE can access to an eNB if there is no previous communication between the UE and the eNB. This access is carried out via the Random Access Channel (RACH). The UE randomly selects a preamble which is sent via the RACH. The preamble is used to recognize the response from the eNB. Such a RACH procedure is contention based. To avoid contention in case of a handover from a source eNB to a target eNB, the set of preambles is split into two basic parts: random preambles, which are randomly selected by the UE; and dedicated preambles, which the eNB sends to a specific UE. The target eNB may send a dedicated preamble to the UE via the source eNB within a transparent container, which is a data portion sent from a potential target eNB towards the UE. This data portion is actually sent from the potential target eNB via the current source eNB to the UE. The source eNB does not change this data portion, hence it being termed a "transparent container". A dedicated preamble is exclusively reserved for the specific UE only and thus avoiding another UE using the same preamble. The RACH access in case of handover is thus kept contention free. Dedicated preambles may thus be considered as reserved resources.

LTE currently only proposes that there be one handover target eNB, but in future versions, or in networks implemented in accordance with other standards or protocols, more than one handover target may be selected. For example, these may be organized in an order of precedence. In such a network, in addition to using at least one designated network node without reserving resources, there may be more than one target network node selected which is requested to reserve resources.

In one method in accordance with the invention, following radio link failure, when the mobile terminal attaches to a candidate network node, the candidate network node to which the mobile terminal is attached requests the source network node to release resources. By attached it is meant that at least the initial steps of the connection process are carried out. The mobile terminal may attach to a candidate network node that is a handover target network node or a designated network node. The source network node may request those network nodes, except that candidate network node to which the mobile terminal is attached, that have reserved resources to release them. In another method, the source network node requests those designated, or handover target, candidate network nodes to release reserved resources, except for that candidate network node to which the mobile terminal is attached. Thus the request is sent to all network nodes that have been sent the context information although only some have reserved resources. It is still useful to send such a message to designated network nodes that have not reserved resources as it alerts them that they no longer need to retain the context information and may discard it. It may be arranged that a network node that has reserved resources releasing them after a predetermined period of time following the request to it to reserve resources. Thus resources are released even if a network node does not receive a release message.

In accordance with an aspect of the invention, following radio link failure and attachment of the mobile terminal to a candidate network node, the source network node informs other candidate network nodes of the attachment. This may be explicit, or implicit, by sending a request to release resources.

Following radio link failure and attachment of the mobile terminal to a candidate network node, other candidate nodes may discard the context information of the mobile terminal. It may be arranged that a network node that has stored context information deletes the context information after a predetermined period of time following receipt of the information about the context of the mobile terminal. Thus context information is deleted even if a network node does not receive a release message.

In a method in accordance with the invention, a request message may be sent to candidate network nodes with an indicator which is set to indicate that resources should, or should not, be reserved for the mobile terminal. In LTE, the request message may be a Handover_Request message and the indicator is an allocation bit included in the Handover_Request message. A Handover_Request_ack message may be sent in response to the Handover_Request message only by network nodes that have reserved resources.

According to a second aspect of the invention, a wireless communications network operates in accordance with the inventive method.

BRIEF DESCRIPTION OF THE DRAWINGS

A method and embodiment of the present invention is now described by way of example, and with reference to the accompanying drawing in which.

DETAILED DESCRIPTION

Figure 1:
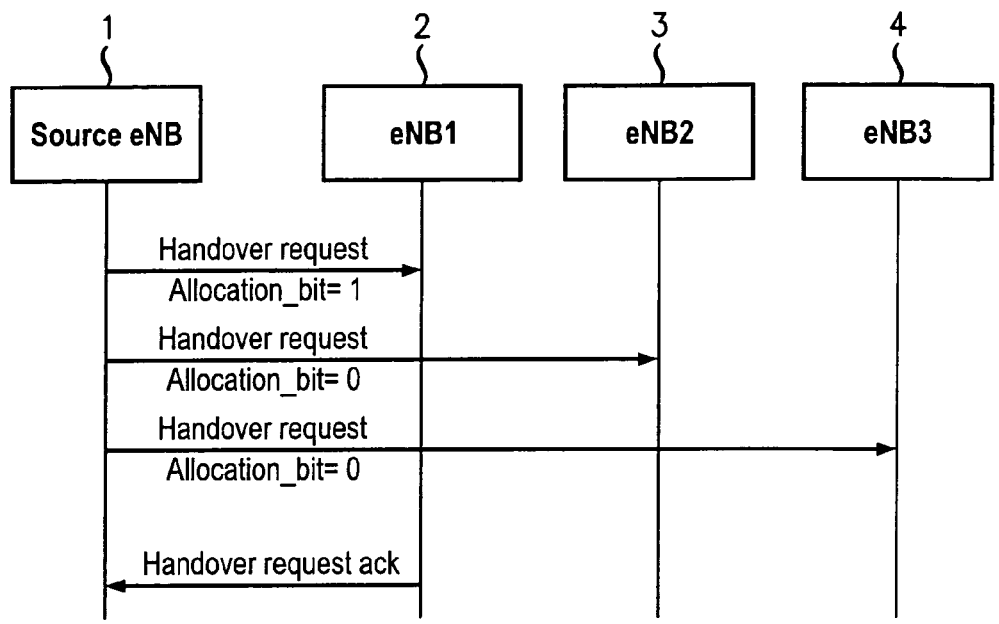
FIGS. 1 and 2 schematically illustrate steps in accordance with the inventive method and a network implementing the method.

With reference to FIG. 1, in an LTE network, a UE (not shown) is connected to a source eNB 1. A Handover_Request message sent to multiple eNBs 2, 3 and 4. One eNB 2 is the selected as a handover target network node. A resource allocation bit included in the Handover_Request message is set to 1 asking the eNB 2 to reserve resources for the UE during a handover procedure. Handover_Request messages are also sent to designated eNBs 3 and 4, the resource allocation bit being set to 0 to indicate that they should store the UE context, and thus make it possible for the UE to access without going via RRC_IDLE, but not reserve any resources.

A Handover_Request_ack message is only sent by eNBs that actually allocate resources, so that in this case, only the handover target eNB 2 sends the acknowledgement message. This also implicitly informs the source eNB 1 as to which eNBs have allocated resources for the UE. Non-allocating eNBs do not send the Handover_Request_ack message.

Figure 2:
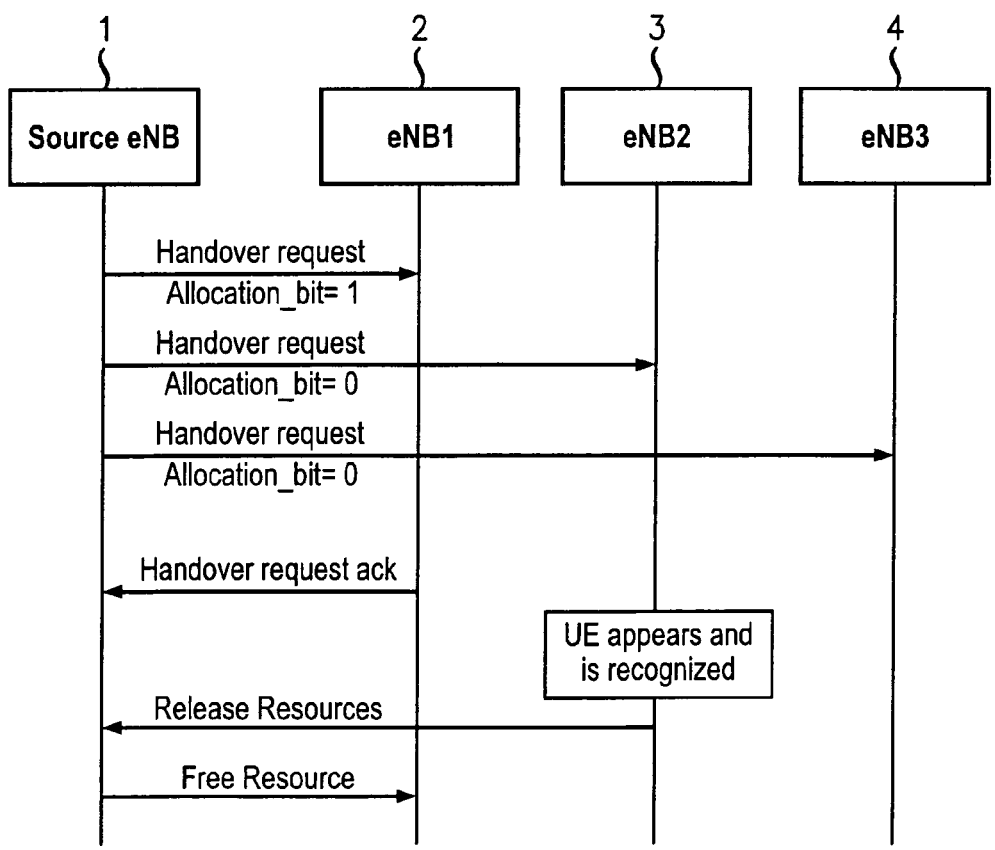

With reference to FIG. 2, this shows the situation after an RLF has occurred and the connection between the UE and source eNB 1 is lost. Instead of reappearing at the handover target eNB 2, the UE contacts a designated eNB 3 that has not allocated any resources for it. This eNB 3 has stored the context information of the UE so the UE can access it while staying in LTE_ACTIVE. Since this eNB 3 was the UE's choice in the framework of UE-based mobility, it has to reserve resources accordingly. Now the UE is completely detached from the source eNB 1 and eNB 3 can send a Release_Resource message, possibly including RNL/TNL information for the forwarding tunnels, to the source eNB 1 and the connection is completed.

In the meantime, the designated target eNB 2 still holds the originally reserved resources and would in principle continue to do so until a timer expires. However, the source eNB 1 informs the designated target eNB 2 that it can release these resources. Context information stored at the network nodes may be discarded on expiry of a predetermined time period from when the context information is received by the node or from some other convenient time.

The present invention may be embodied in other specific forms and other methods without departing from its spirit or essential characteristics. The described embodiments and methods are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method for radio link failure recovery in a wireless communications network, including the steps of:
    selecting a network node as a handover target in the event of handover of a mobile terminal from a source network node;
    sending to the handover target network node context information for said mobile terminal and an indication to the handover target network node to reserve resources for said mobile terminal, the indication being a handover request message including an indicator which is set to indicate that resources should be reserved for the mobile terminal;
    designating a network node as a handover candidate in the event of failure of a radio link between the mobile terminal and the source network node; and
    sending to the designated handover candidate network node context information for said mobile terminal and an indication to the designated handover candidate network node not to reserve resources for said mobile terminal, the indication being a handover request message including an indicator which is set to indicate that resources should not be reserved for the mobile terminal.

2. The method as claimed in claim 1 and wherein the act of designating includes designating a plurality of network nodes as handover candidate network nodes in the event of failure of the radio link between the mobile terminal and the source network node and wherein the act of sending includes sending context information for said mobile terminal to each designated handover candidate network node and wherein the indication is sent to each designated handover candidate network node not to reserve resources for said mobile terminal.

3. The method as claimed in claim 1 further including following radio link failure, when the mobile terminal attaches to a network node, the network node to which the mobile terminal is attached requesting the source network node to release resources.

4. The method as claimed in claim 3 and further including the source network node requesting those network nodes, except that network node to which the mobile terminal is attached, that have reserved resources to release them.

5. The method as claimed in claim 1 and including the handover target network node that has reserved resources releasing them after a predetermined period of time following the request to it to reserve resources.

6. The method as claimed in claim 1 and including a network node that has stored context information discarding it after a predetermined period of time.

7. The method as claimed in claim 1 further including following radio link failure and attachment of the mobile terminal to a network node, the source network node informing other network nodes of the attachment.

8. The method as claimed in claim 1 further including following radio link failure and attachment of the mobile terminal to a network node, other nodes discarding the context information of the mobile terminal.

9. The method as claimed in claim 1 further including sending a request message to network nodes with an indicator which is set to indicate that resources should, or should not, be reserved for the mobile terminal.

10. The method as claimed in claim 1 wherein the network is in accordance with Long Term Evolution (LTE) specifications.

11. The method as claimed in claim 10 further including sending a request message to network nodes with an indicator which is set to indicate that resources should, or should not, be reserved for the mobile terminal, the request message being a Handover_Request message and the indicator being an allocation bit included in the Handover_Request message.

12. The method as claimed in claim 11 further including sending a Handover_Request_ack message in response to the Handover_Request message only by network nodes that have reserved resources.

13. The method as claimed in claim 10 further including following radio link failure and attachment of the mobile terminal to a network node, the network node to which the mobile terminal is attached sending a Release_Resource message to the source network node and the source network node sending a Free_Resource message to all other network nodes that have sent a Handover_Request_ack message.

14. A wireless communications network comprising
    a plurality of nodes, a node being designated as a handover candidate to accept a mobile terminal in the event of failure of a radio link between the mobile terminal and a source network node; and
    wherein the designated handover candidate network node is arranged to receive context information for said mobile terminal and an indication not to reserve resources for said mobile terminal, the indication being a handover request message including an indicator which is set to indicate that resources should be reserved for the mobile terminal.

* * * * *